US009615130B2

(12) United States Patent
Wang (10) Patent No.: US 9,615,130 B2
(45) Date of Patent: Apr. 4, 2017

(54) METHOD AND DEVICE FOR PROCESSING MULTIMEDIA FRAME AND STORAGE MEDIUM (71) Applicant: HISENSE BROADBAND MULTIMEDIA TECHNOLOGIES CO., LTD., Qingdao (CN)

(72) Inventor: Xiongcai Wang, Qingdao (CN)

(73) Assignees: HISENSE BROADBAND MULTIMEDIA TECHNOLOGIES CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 14/707,288

(22) Filed: May 8, 2015

(65) Prior Publication Data
US 2016/0142766 A1 May 19, 2016

(30) Foreign Application Priority Data
Nov. 14, 2014 (CN) .......................... 2014 1 0649928

(51) Int. Cl.
H04N 5/04 (2006.01)
H04N 21/44 (2011.01)
H04N 21/43 (2011.01)
H04N 21/434 (2011.01)
H04N 21/8547 (2011.01)
H04N 21/438 (2011.01)

(52) U.S. Cl.
CPC ... *H04N 21/44004* (2013.01); *H04N 21/4305* (2013.01); *H04N 21/4343* (2013.01); *H04N 21/4384* (2013.01); *H04N 21/44008* (2013.01); *H04N 21/8547* (2013.01)

(58) Field of Classification Search
CPC ....................... H04N 21/4305; H04N 21/4307
See application file for complete search history.

(56) References Cited

U.S. PATENT DOCUMENTS

2004/0264577 A1* 12/2004 Jung ................ H04N 21/42615
375/240.24
2008/0198921 A1* 8/2008 Kim ................... H04N 21/4307
375/240.01
2014/0269942 A1* 9/2014 Mikov ................ H04N 19/172
375/240.27

* cited by examiner

Primary Examiner — Olugbenga Idowu
(74) Attorney, Agent, or Firm — Harness, Dickey & Pierce, P.L.C.

(57) ABSTRACT

The disclosure discloses a method and device for processing a multimedia frame and a storage medium. The method includes: judging whether there is a multimedia frame in a buffer queue with a sudden change to a time difference thereof; and playing asynchronously M multimedia frames to be processed in a current processing cycle if there is a multimedia frame in the buffer queue with a sudden change to the time difference thereof, and playing synchronously the M multimedia frames to be processed in the current processing cycle if there is no multimedia frame in the buffer queue with a sudden change to the time difference thereof and the time differences of the M multimedia frames to be processed are below a preset threshold.

13 Claims, 3 Drawing Sheets

METHOD AND DEVICE FOR PROCESSING MULTIMEDIA FRAME AND STORAGE MEDIUM

CROSS-REFERENCE TO RELATED APPLICATION

This application claims the benefit and priority of Chinese Patent Application No. 201410649928.2 filed Nov. 14, 2014. The entire disclosure of the above application is incorporated herein by reference.

FIELD

The present disclosure relates to the field of multimedia communications and particularly to a method and device for processing multimedia frame and a storage medium.

BACKGROUND

This section provides background information related to the present disclosure which is not necessarily prior art.

In a digital TV system, an encoder at a transmitting end encodes an audio analog signal or a video analog signal into an audio frame, or a video frame, which is decoded by a decoder at a receiving end. In order ensure normal operation of the encoder at the transmitting end and the decoder at the receiving end, the encoder and the decoder need to be kept consistent in frequency and phase.

Possible operating modes of the encoder and the decoder will be described below respectively.

At the transmitting end, the audio analog signal or the video analog signal is sampled, quantized, compressed and encoded by the encoder according to the MPEG-2 standard into an Elementary Stream (ES) which is an un-segmented consecutive stream. The ES is segmented into segments, corresponding headers are added to the segments, and the segments are packaged into a Packet Elementary Stream (PES) with packet head information including a Presentation Time Stamp (PTS) and a Decoding Time Stamp (DTS). A corresponding header is added to the PES packet to be transmitted, and then the PES packet is packaged into a 188-byte or 204-byte Transport Stream (TS) with a packet head including a Program Clock Reference (PCR) generated by sampling according to a time reference of the encoder, and a PES refers to an audio frame or a video frame.

At the receiving end, the decoder decodes the TS data packet into the audio frame or the video frame, extracts the PCR from the TS data packet, and recovers a System Time Clock (STC), which is a time reference of the decoder, from the extracted PCR, to thereby ensure the encoder and the decoder to be consistent in frequency and phase. The decoder extracts the PTS corresponding to the audio frame or the PTS corresponding to the video frame from the audio frame or the video frame. The audio frame or the video frame is played according to the PTS corresponding to the audio frame or the PTS corresponding to the video frame. The frame can be played particularly in such a way that the time difference between the time when the audio frame or the video frame is received, determined from the STC and the time indicated by the PTS is determined, and if the time difference is below a preset threshold, then the frame is played synchronously; or if the time difference is above the preset threshold, then the frame is played asynchronously. The frame needs to be played synchronously by counting each audio frame or video frame as a skipped frame or a duplicated frame. The number of skipped frames or duplicated frames can be calculated according to the time difference between the time, when the audio frame or the video frame is received, determined from the STC and the time indicated by the PTS, divided by the average time for which each frame is played. If the calculated number of skipped frames or duplicated frames is smaller than 1, then no skipped frame or duplicated frame will be processed; otherwise, the calculated number of skipped frames or duplicated frames are processed.

SUMMARY

This section provides a general summary of the disclosure, and is not a comprehensive disclosure of its full scope or all of its features.

In an aspect, an embodiment of the disclosure provides a method for processing a multimedia frame, the method including:

judging whether there is a multimedia frame in a buffer queue with a sudden change to a time difference thereof, wherein the time difference is a difference between a time indicated by a presentation time stamp of the multimedia frame and a time when the multimedia frame is received, and there are N multimedia frames to be processed, sorted in an order of the time of being received, in the buffer queue, wherein N is a positive integer; and playing asynchronously M multimedia frames to be processed in a current processing cycle if there is a multimedia frame in the buffer queue with a sudden change to the time difference thereof, wherein the M multimedia frames to be processed are first M multimedia frames, sorted in an ascending order of the time of being received, in the buffer queue, and playing synchronously the M multimedia frames to be processed in the current processing cycle if there is no multimedia frame in the buffer queue with a sudden change to the time difference thereof and the time differences of the M multimedia frames to be processed are below a preset threshold.

In another aspect, an embodiment of the disclosure provides a device for processing a multimedia frame, the device including:

one or more processors; and one or more computer readable memories storing instruction codes, wherein the one or more processors are configured to execute the instruction codes to enable the device to be configured to:

judge whether there is a multimedia frame in a buffer queue with a sudden change to a time difference thereof, wherein the time difference is a difference between a time indicated by a presentation time stamp of the multimedia frame and a time when the multimedia frame is received, and there are N multimedia frames to be processed, sorted in an order of the time of being received, in the buffer queue, wherein N is a positive integer; and play asynchronously M multimedia frames to be processed in a current processing cycle if there is a multimedia frame in the buffer queue with a sudden change to the time difference thereof, wherein the M multimedia frames to be processed are first M multimedia frames, sorted in an ascending order of the time of being received, in the buffer queue; and play synchronously the M multimedia frames to be processed in the current processing cycle if there is no multimedia frame in the buffer queue with a sudden change to the time difference thereof and the time differences of the M multimedia frames to be processed are below a preset threshold.

In still another aspect, an embodiment of the disclosure provides a computer readable storage medium, storing instruction codes, wherein the instruction codes are executed to enable a device for processing a multimedia frame to be configured to:

judge whether there is a multimedia frame in a buffer queue with a sudden change to a time difference thereof, wherein the time difference is a difference between a time indicated by a presentation time stamp of the multimedia frame and a time when the multimedia frame is received, and there are N multimedia frames to be processed, sorted in an order of the time of being received, in the buffer queue, wherein N is a positive integer; and play asynchronously M multimedia frames to be processed in a current processing cycle if there is a multimedia frame in the buffer queue with a sudden change to the time difference thereof, wherein the M multimedia frames to be processed are first M multimedia frames, sorted in an ascending order of the time of being received, in the buffer queue; and play synchronously the M multimedia frames to be processed in the current processing cycle if there is no multimedia frame in the buffer queue with a sudden change to the time difference thereof and the time differences of the M multimedia frames to be processed are below a preset threshold.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
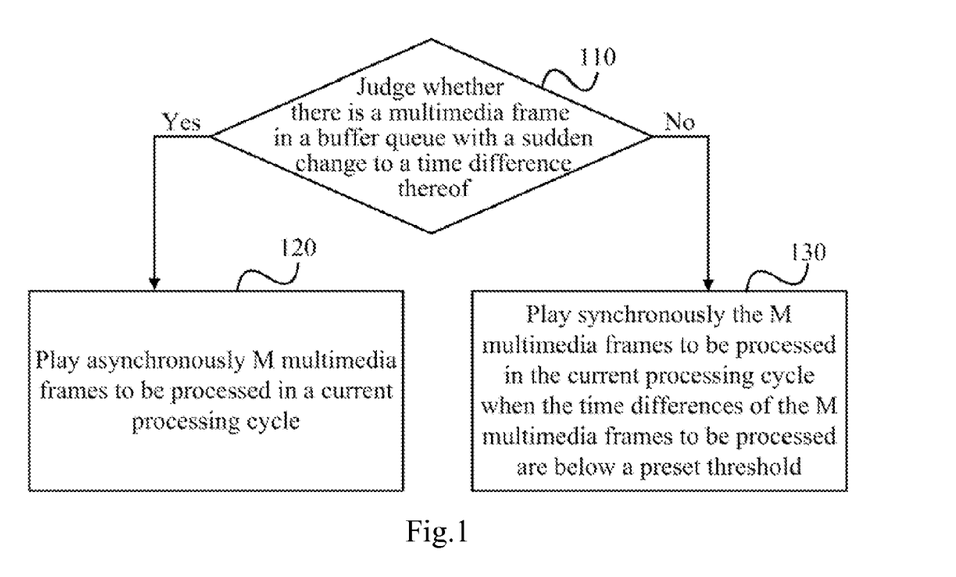
FIG. 1 illustrates a flow chart of a method for processing a multimedia frame according to an embodiment of the disclosure.

As illustrated in FIG. 1, a processing flow of a method for processing a multimedia frame according to an embodiment of the disclosure is as follows:

The operation 110 is to judge whether there is a multimedia frame in a buffer queue with a sudden change to a time difference thereof, where the time difference is the difference between a time indicated by a PTS of the multimedia frame and a time when the multimedia frame is received, and there are N multimedia frames to be processed, sorted in an order of the time of being received, in the buffer queue, where N is a positive integer.

The multimedia frames can be categorized by their multimedia types into audio frames, video frames, etc.

The number N of multimedia frames to be processed in the buffer queue is preset as required in real processing.

The operation 120 is to play asynchronously M multimedia frames to be processed in a current processing cycle if there is a multimedia frame in the buffer queue with a sudden change to the time difference thereof. The M multimedia frames to be processed are first M multimedia frames, sorted in an ascending order of the time of being received, in the buffer queue.

"Playing asynchronously" refers to different types of multimedia frames being not played synchronously. Taking an audio frame and a video frame as an example, playing asynchronously refers to the audio and video frames being not played synchronously.

"Being sorted in an ascending order of the time of being received" refers to the multimedia frames being sorted in an order of the time of being received so that the multimedia frame received at the earliest time is sorted firstly and the multimedia frame received at the latest time is sorted lastly. For example, if there are three multimedia frames received respectively at time 00:00:01, 00:00:02 and 00:00:03, then they are sorted in an ascending order of the time of being received as: the multimedia frame received at the time 00:00:01, the multimedia frame received at the time 00:00:02, and the multimedia frame received at the time 00:00:03.

In this operation, in the current processing cycle, the number M of multimedia frames to be processed is preset as required in real processing, and the value of M is $1<=M<=N$, in which M is an integer.

The operation 130 is to play synchronously the M multimedia frames to be processed in the current processing cycle if there is no multimedia frame in the buffer queue with a sudden change to the time difference thereof and the time differences of the M multimedia frames to be processed are below a preset threshold.

"Playing synchronously" refers to different types of multimedia frames being played synchronously. Taking an audio frame and a video frame as an example, playing asynchronously refers to the audio and video frames being played synchronously.

The processing flow above is performed periodically, the time length of processing cycle can be represented as a number of multimedia frames.

In the embodiment of the disclosure, it is judged whether there is a multimedia frame in the buffer queue for which there is a sudden change to the time difference between a time indicated by a presentation time stamp and a time of being received. If there is no multimedia frame to be processed in the buffer queue for which there is a sudden change to the time difference, then the multimedia frames to be processed in the current processing cycle are played synchronously. Particularly for the stream in which there is such a multimedia frame with time difference between a time indicated by a presentation time stamp and a time of being received suddenly becoming larger and then resuming normality, the stream is played synchronously when the stream is stable and played asynchronously when there is a sudden change in the embodiment of the disclosure to thereby alleviate interrupted playing of pictures. If there is a multimedia frame to be processed in the buffer queue for which there is a sudden change to the time difference, then the multimedia frames to be processed in the current processing cycle are played asynchronously, and since they are played asynchronously timely, an instant response can be improved, and synchronous playing of the multimedia frames even after there is a sudden change to the time difference can be alleviated to thereby prevent pictures from being played interruptedly while the multimedia frames being played. Moreover the method according to the embodiment of the disclosure is performed periodically. The playing operations can be performed in each processing cycle in response to a result of the judgment in the current processing cycle to thereby alleviate possible interrupted playing of pictures due to synchronous playing for a long period of time, and alleviate audio and video misalignment due to asynchronous playing from a long period of time.

In the operation 110 described above, it can be judged whether there is a multimedia frame in the buffer queue with a sudden change to the time difference thereof in multiple schemes, several of which will be listed below in embodiments of the disclosure.

An embodiment of the disclosure provides a first scheme to detect a sudden change as follows:

It is judged whether a first difference between each multimedia frame in the buffer queue other than the multimedia frame received at the earliest time and the multimedia frame received at the previous time is above a first threshold. The first difference is the difference between the time difference of the multimedia frame and the time difference of the multimedia frame received at the previous time.

If there is no first difference being above the first threshold, then a time difference of one multimedia frame in the buffer queue is selected as a reference, and it is judged whether a second difference between the time difference of each multimedia frame in the buffer queue and the reference is above a second threshold.

There being a multimedia frame in the buffer queue with a sudden change to the time difference thereof refers to there being a multimedia frame in the buffer queue with the first difference, from the multimedia frame received at the previous time, being above the first threshold or there being a multimedia frame in the buffer queue with the second difference, from the reference, being above the second threshold; and there being no multimedia frame in the buffer queue with a sudden change to the time difference thereof refers to there being neither multimedia frame in the buffer queue with the first difference, from the multimedia frame received at the previous time, being above the first threshold nor multimedia frame in the buffer queue with the second difference, from the reference, being above the second threshold.

The multimedia frame received at the previous time corresponding to a multimedia frame refers to a multimedia frame received at an adjacent time to and earlier than the corresponding multimedia frame.

The time difference of a multimedia frame in the buffer queue can be selected as the reference by selecting the time difference of any multimedia frame in the buffer queue as the reference or by selecting the time difference of the multimedia frame received at the latest time in the buffer queue as the reference.

In the embodiment of the disclosure, firstly it is judged whether the first difference between each multimedia frame in the buffer queue other than the multimedia frame received at the earliest time and the multimedia frame received at the previous time is above the first threshold, and if there is no first difference above the first threshold, then it is further judged whether the second difference between the time difference of each multimedia frame in the buffer queue and the reference is above the second threshold. This scheme can improve the criterion to determine no sudden change, that is, it will be determined that there is no multimedia frame in the buffer queue with a sudden change to the time difference thereof only if there is neither first difference above the first threshold nor second difference above the second threshold, thus further lowering a risk of interrupted playing of pictures when being played.

In the embodiment of the disclosure, if it is determined that there is a sudden change to the time difference in the first scheme above to detect a sudden change, then the multimedia frames to be processed in the current processing cycle are processed asynchronously, thus further making a good instant response, and improving the processing efficiency because the judgment is skipped for the remaining multimedia frames to be processed in the buffer queue. Alternatively after it is judged whether there is a sudden change to the time difference for the respective multimedia frames to be processed in the buffer queue, if a result of the judgment shows a multimedia frame in the buffer queue with a sudden change to time the difference thereof, then the multimedia frames to be processed in the current processing cycle are processed asynchronously.

In the first scheme above to detect a sudden change, the first threshold and the second threshold are statically derived empirical values, and the first threshold and the second threshold may or may not be equal.

There are numerous implementations of the first scheme to detect a sudden change.

In an embodiment of the disclosure, it can be judged whether the first difference between each multimedia frame in the buffer queue other than the multimedia frame received at the earliest time and the multimedia frame received at the previous time is above the first threshold in such a way that firstly it is judged whether the first difference between each of the last M multimedia frames to be processed, sorted in an ascending order of the time of being received, in the buffer queue and the multimedia frame received at the previous time is above the first threshold; and if there is no first difference above the first threshold, then it is judged whether the first difference between each remaining multimedia frame to be processed in the buffer queue other than the multimedia frame received at the earliest time and the multimedia frame received at the previous time is above the first threshold; and/or It can be judged whether the second difference between the time difference of each multimedia frame in the buffer queue and the reference is above the second threshold in such a way that firstly it is judged whether the second difference between the time difference of each of the last M multimedia frames to be processed, sorted in an ascending order of the time of being received, in the buffer queue and the reference is above the second threshold; and if there is no second difference above the second threshold, then it is judged whether the second difference between the time difference of each remaining multimedia frame to be processed in the buffer queue and the reference is above the second threshold.

In the embodiment of the disclosure, when it is judged whether there is a multimedia frame to be processed with a sudden change to the time difference thereof, firstly it is judged whether there is a sudden change to the time difference of any of the last M multimedia frames to be processed, sorted in an ascending order of the time of being received, in the buffer queue, and only if there is no sudden change to the time difference of any of the last M multimedia frames to be processed, sorted in an ascending order of the time of being received, in the buffer queue, then the judgment will be further made for the remaining multimedia frames to be processed in the buffer queue; and if there is a sudden change to the time difference of any of the last M multimedia frames to be processed, sorted in an ascending order of the time of being received, in the buffer queue, then the judgment will not be further made for the remaining multimedia frames to be processed in the buffer queue, so that it will not be necessary to make the judgment for all the multimedia frames in the buffer queue, thus the processing efficiency is improved.

In an embodiment of the disclosure, in an implementation of the first scheme above to detect a sudden change, when it is judged whether the first difference between each multimedia frame in the buffer queue other than the multimedia frame received at the earliest time and the multimedia frame received at the previous time is above the first threshold, firstly it can be judged whether the first difference between each of the last M multimedia frames to be processed, sorted in an ascending order of the time of being received, in the buffer queue and the multimedia frame received at the previous time is above the first threshold in such a way that it is judged whether the first difference between each of the last M multimedia frames to be processed in the buffer queue and the multimedia frame received at the previous time is above the first threshold, in a descending order of the time of being received; and if there is no first difference above the first threshold, then it can be judged whether the first difference between each remaining multimedia frame to be processed in the buffer queue other than the multimedia frame received at the earliest time and the multimedia frame received at the previous time is above the first threshold in such a way that it is judged whether the first difference between each remaining multimedia frame to be processed in the buffer queue other than the multimedia frame received at the earliest time and the multimedia frame received at a previous time is above the first threshold, in a descending order of the time of being received; and/or Firstly it can be judged whether the second difference between the time difference of each of the last M multimedia frames to be processed, sorted in an ascending order of the time of being received, in the buffer queue and the reference is above the second threshold in such a way that it is judged whether the second difference between the time difference of each of the last M multimedia frames to be processed in the buffer queue and the reference is above the second threshold, in a descending order of the time of being received; and then it can be judged whether the second difference between the time difference of each remaining multimedia frame to be processed in the buffer queue and the reference is above the second threshold in such a way that it is judged whether the second difference between the time difference of each remaining multimedia frame to be processed in the buffer queue and the reference is above the second threshold, in a descending order of the time of being received.

The judgment has been made firstly for the time differences of the last M multimedia frames sorted in an ascending order of the time of being received, as described above by way of an example. It shall be noted that the number of multimedia frames for which the judgment is made firstly may be less than M when the judgment is made in batches.

In an embodiment of the disclosure, in an implementation of the first scheme above to detect a sudden change, the value of M can be 1, that is, one multimedia frame is processed in each processing cycle. Each multimedia frame is processed in the solution according to the respective embodiments above so that a sudden change to the time difference can be detected more sensitively.

An embodiment of the disclosure provides a second scheme to detect a sudden change as follows:

It is judged whether a first difference between each multimedia frame in the buffer queue other than the multimedia frame received at the earliest time and the multimedia frame received at the previous time is above a first threshold, the first difference is the difference between the time difference of the multimedia frame and the time difference of the multimedia frame received at the previous time.

There being a multimedia frame in the buffer queue with a sudden change to the time difference thereof refers to there being a multimedia frame in the buffer queue with the first difference, from the multimedia frame received at the previous time, being above the first threshold; and there being no multimedia frame in the buffer queue with a sudden change to the time difference thereof refers to there being no multimedia frame in the buffer queue with the first difference, from the multimedia frame received at the previous time, being above the first threshold.

If it is determined that there is a sudden change to the time difference in the second scheme above to detect a sudden change, then the multimedia frames to be processed in the current processing cycle are processed asynchronously, thus further making a good instant response, and improving the processing efficiency because the judgment is skipped for the remaining multimedia frames to be processed in the buffer queue. Alternatively after it is judged whether there is a sudden change to the time difference for the respective multimedia frames to be processed in the buffer queue, if a result of the judgment shows a multimedia frame in the buffer queue with a sudden change to the time difference thereof, then the multimedia frames to be processed in the current processing cycle are processed asynchronously.

There are numerous implementations of the second scheme to detect a sudden change.

In an embodiment of the disclosure, it can be judged whether the first difference between each multimedia frame in the buffer queue other than the multimedia frame received at the earliest time and the multimedia frame received at the previous time is above the first threshold in such a way that firstly it is judged whether the first difference between each of the last M multimedia frames to be processed, sorted in an ascending order of the time of being received, in the buffer queue and the multimedia frame received at the previous time is above the first threshold; and if there is no first difference above the first threshold, then it is judged whether the first difference between each remaining multimedia frame to be processed in the buffer queue other than the multimedia frame received at the earliest time and the multimedia frame received at the previous time is above the first threshold.

In the embodiment of the disclosure, in an implementation of the second scheme above to detect a sudden change, firstly it can be judged whether the first difference between each of the last M multimedia frames to be processed, sorted in an ascending order of the time of being received, in the buffer queue and the multimedia frame received at the previous time is above the first threshold in such a way that it is judged whether the first difference between each of the last M multimedia frames to be processed in the buffer queue and the multimedia frame received at the previous time is above the first threshold, in a descending order of the time of being received; and if there is no first difference above the first threshold, then it can be judged whether the first difference between each remaining multimedia frame to be processed in the buffer queue other than the multimedia frame received at the earliest time and the multimedia frame received at the previous time is above the first threshold in such a way that it is judged whether the first difference between each remaining multimedia frame to be processed in the buffer queue other than the multimedia frame received at the earliest time and the multimedia frame received at the previous time is above the first threshold, in a descending order of the time of being received.

The judgment has been made firstly for the time differences of the last M multimedia frames sorted in an ascending order of the time of being received, as described above by way of an example. It shall be noted that the number of multimedia frames for which the judgment is made firstly may be less than M when the judgment is made in batches.

In an embodiment of the disclosure, in an implementation of the second scheme above to detect a sudden change, the value of M can be 1, that is, one multimedia frame is processed in each processing cycle. Each multimedia frame is processed in the solution according to the respective embodiments above so that a sudden change to the time difference can be detected more sensitively.

In the embodiments above, it will be further judged whether the time differences of the multimedia frames to be processed are below the preset threshold in addition to the judgment of whether there is a sudden change to the time differences, and either of these two judgments may be made before or after the other judgment. It can be judged whether the time difference is below the preset threshold as follows:

It is judged whether the time differences of the M multimedia frames to be processed in the buffer queue are below the preset threshold; and if the time differences are not below the preset threshold, then the M multimedia frames to be processed in the current processing cycle are played asynchronously.

Figure 2:
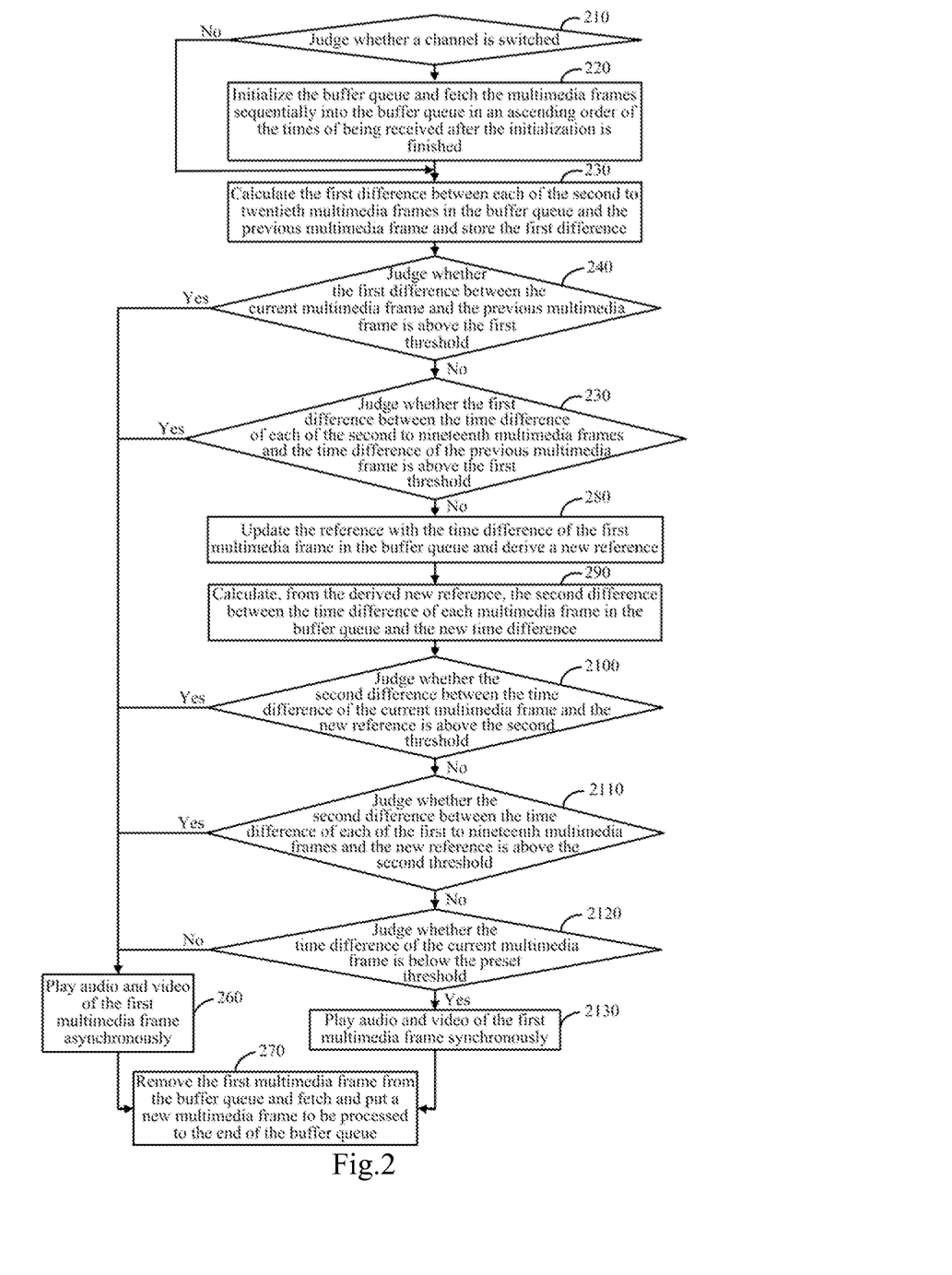
FIG. 2 illustrates a flow chart of a method for processing an audio frame or a video frame according to an embodiment of the disclosure, in which an audio frame or a video frame is processed as an example.

For example, in an application scenario where audio and video are processed, a method for processing an audio frame or a vide frame is as illustrated in FIG. 2, and in this application scenario, the multimedia frames are audio frames or video frames, and there are 20 multimedia frames in the buffer queue. The multimedia frame received at the earliest time is the first multimedia frame in the buffer queue, and the multimedia frame received at the latest time is the last multimedia frame in the buffer queue, and there is one multimedia frame to be processed in one processing cycle. Processing operations of this processing method are as follows:

The operation 210 is to judge whether there is a channel switching operation, and if there is a channel switching operation, then the operation 220 is performed; otherwise, the operation 230 is performed.

The channel switching operation can be performed particularly as in the prior art.

The operation 220 is to initialize the buffer queue and to fetch the multimedia frames sequentially into the buffer queue in an ascending order of the time of being received after the initialization is finished.

Since the time differences between the time indicated by PTS s corresponding to the multimedia frames and the time of being received are not correlated between respective programs, and in order to prevent interference to each other, the buffer queue needs to be initialized each time a channel is switched. The buffer queue can be initialized in numerous approaches, and optionally all the multimedia frames in the buffer queue are stored as current multimedia frames, the first difference between each of the second to the twentieth multimedia frames in the buffer queue and the previous multimedia frame is set to zero, the time difference of the current multimedia frame is selected as the reference, and the second difference between the time difference of each multimedia frame in the buffer queue and the reference is set to zero.

The current multimedia frame refers to a multimedia frame to be processed in the current processing cycle. In this embodiment of the disclosure, the current multimedia frame refers to the multimedia frame received at the latest time, i.e., the twentieth multimedia frame.

The operation 230 is to calculate the first difference between each of the second to twentieth multimedia frames in the buffer queue and the previous multimedia frame of each multimedia frame and to store the first difference.

The operation 240 is to judge whether the first difference between the current multimedia frame and the previous multimedia frame is above the first threshold, and if so, then the operation 260 is performed; otherwise, the operation 250 is performed.

In an embodiment of the disclosure, the value of the first threshold is 100.

The operation 250 is to judge whether the first difference between the time difference of each of the second to nineteenth multimedia frames and the time difference of the previous multimedia frame is above the first threshold, and if there is a first difference above the first threshold, then the operation 260 is performed; or if there is no first difference above the first threshold, then the operation 280 is performed.

The operation 260 is to play audio and video of the first multimedia frame asynchronously, and the operation 270 is performed.

The operation 270 is to remove the first multimedia frame from the buffer queue and to fetch and place a new multimedia frame to be processed to the end of the buffer queue.

The operation 280 is to update the reference with the time difference of the first multimedia frame in the buffer queue and to obtain a new reference, that is, the new reference is the time difference of the first multimedia frame in the buffer queue.

The operation 290 is to calculate, from the obtained new reference, the second difference between the time difference of each multimedia frame in the buffer queue and the new reference and to store the second difference.

The operation 2100 is to judge whether the second difference between the time difference of the current multimedia frame and the new reference is above the second threshold, and if so, then the operation 260 is performed; otherwise, the operation 2110 is performed.

In an embodiment of the disclosure, the value of the second threshold is 100.

The operation 2110 is to judge whether the second difference between the time difference of each of the first to nineteenth multimedia frames and the new reference is above the second threshold, and if there is a second difference above the second threshold, then the operation 260 is performed; or if there is no second difference above the second threshold, then the operation 2120 is performed.

In this operation, once it is judged that there is a second difference above the second threshold, then the operation 260 is performed, or after it is judged whether the second difference between the time difference of each multimedia frame in the buffer queue and the new reference is above the second threshold, if there is a second difference above the second threshold, then the operation 260 is performed; or if there is no second difference above the second threshold, then the operation 2120 is performed.

The operation 2120 is to judge whether the time difference of the current multimedia frame is below the preset threshold, and if so, then the operation 2130 is performed; otherwise, the operation 260 is performed.

The operation 2130 is to play audio and video of the first multimedia frame synchronously, and the operation 270 is performed.

The flow proceeds to the next processing cycle after the multimedia frames to be processed in the current cycle are processed.

The entire processing flow can be performed when a frame of multimedia data is decoded, and the processing flow can be performed after each frame of data is decoded.

Figure 3:
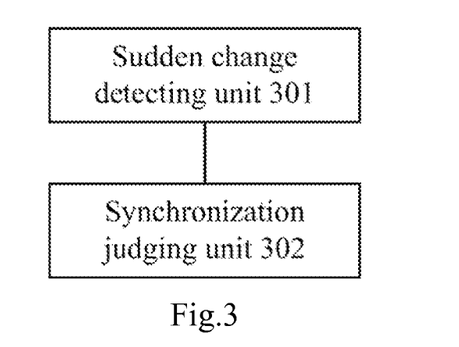
FIG. 3 illustrates a schematic diagram of a first device for processing a multimedia frame according to an embodiment of the disclosure.

Based upon the same inventive idea, an embodiment of the disclosure provides a device for processing a multimedia frame as illustrated in FIG. 3, in which the device includes a sudden change detecting unit 301 and a synchronization judging unit 302.

The sudden change detecting unit 301 is configured to judge whether there is a multimedia frame in a buffer queue with a sudden change to a time difference thereof, the time difference is the difference between a time indicated by a presentation time stamp of the multimedia frame and a time when the multimedia frame is received, and there are N multimedia frames to be processed, sorted in an order of the time of being received, in the buffer queue, where N is a positive integer.

The synchronization judging unit 302 is configured to play asynchronously M multimedia frames to be processed in a current processing cycle if there is a multimedia frame in the buffer queue with a sudden change to the time difference thereof, the M multimedia frames to be processed are first M multimedia frames, sorted in an ascending order of the time of being received, in the buffer queue; and to play synchronously the M multimedia frames to be processed in the current processing cycle if there is no multimedia frame in the buffer queue with a sudden change to the time difference thereof and the time differences of M multimedia frames are below a preset threshold.

In an embodiment of the disclosure, the sudden change detecting unit 301 is configured:

To judge whether a first difference between each multimedia frame in the buffer queue other than the multimedia frame received at the earliest time and the multimedia frame received at the previous time is above a first threshold, the first difference is the difference between the time difference of the multimedia frame and the time difference of the multimedia frame received at the previous time; and If there is no first difference above the first threshold, to select the time difference of a multimedia frame in the buffer queue as a reference, and to judge whether a second difference between the time difference of each multimedia frame in the buffer queue and the reference is above a second threshold.

There being a multimedia frame in the buffer queue with a sudden change to the time difference thereof refers to there being a multimedia frame in the buffer queue with the first difference, from the multimedia frame received at the previous time, being above the first threshold or there being a multimedia frame in the buffer queue with the second difference, from the reference, being above the second threshold; and there being no multimedia frame in the buffer queue with a sudden change to the time difference thereof refers to there being neither multimedia frame in the buffer queue with the first difference above the first threshold nor multimedia frame in the buffer queue with the second difference being above the second threshold.

In an embodiment of the disclosure, the sudden change detecting unit 301 configured to judge whether the first difference between each multimedia frame in the buffer queue other than the multimedia frame received at the earliest time and the multimedia frame received at the previous time is above the first threshold is configured to firstly judge whether the first difference between each of the last M multimedia frames to be processed, sorted in an ascending order of the time of being received, in the buffer queue and the multimedia frame received at the previous time is above the first threshold; and if there is no first difference above the first threshold, to judge whether the first difference between each remaining multimedia frame to be processed in the buffer queue other than the multimedia frame received at the earliest time and the multimedia frame received at the previous time is above the first threshold; and/or The sudden change detecting unit 301 configured to judge whether the second difference between the time difference of each multimedia frame in the buffer queue and the reference is above the second threshold is configured to firstly judge whether the second difference between the time difference of each of the last M multimedia frames to be processed, sorted in an ascending order of the time of being received, in the buffer queue and the reference is above the second threshold; and if there is no second difference above the second threshold, to judge whether the second difference between the time difference of each remaining multimedia frame to be processed in the buffer queue and the reference is above the second threshold.

Figure 4:
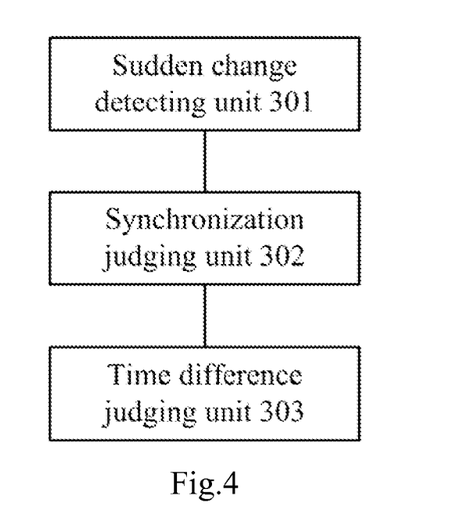
FIG. 4 illustrates a schematic diagram of a second device for processing a multimedia frame according to an embodiment of the disclosure.

In an embodiment of the disclosure, the device further includes a time difference judging unit 303 as illustrated in FIG. 4.

The time difference judging unit 303 is configured to judge whether the time differences of the M multimedia frames to be processed in the buffer queue are below the preset threshold.

The synchronization judging unit 302 is further configured to play the M multimedia frames to be processed in the current processing cycle if the time differences are not below the preset threshold.

Figure 5:
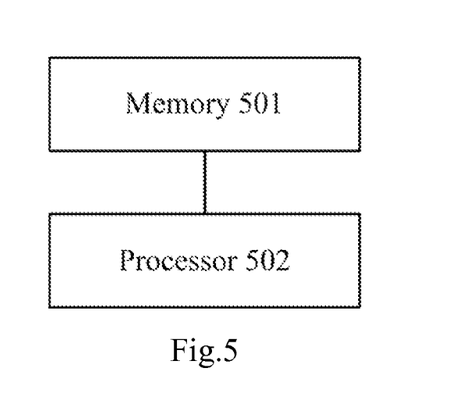
FIG. 5 illustrates a schematic diagram of another device for processing a multimedia frame according to an embodiment of the disclosure.

Referring to FIG. 5, an embodiment of the disclosure further provides a device for processing a multimedia frame, the device including a memory 501 and a processor 502, in which:

The memory 501 stores thereon one or more program codes configured to be executable by the one or more processors 502. The one or more program codes above include instructions for performing the methods as illustrated in FIG. 1 to FIG. 2 for which reference can be made to FIG. 1 and FIG. 2 and the descriptions thereof.

In another aspect some embodiments of the disclosure further provide a computer readable storage medium which can be a computer readable storage medium included in the memory in the embodiment above of the disclosure or which can be a separate computer readable storage medium instead of being installed in a terminal. The computer readable storage medium stores thereon one or more programs (the computer readable storage medium can be one or more magnetic disk storage devices, flash memory devices or other nonvolatile solid-state memory devices, CD-ROMs, optical memories, etc., in some embodiments), and the one or more programs can be executed by one or more processors to perform the method for processing a multimedia frame for which reference can be made to the descriptions of the embodiments as illustrated in FIG. 1 and FIG. 2, so a repeated description thereof will be omitted here.

Advantageous effects of the embodiments of the disclosure are as follows:

In the embodiments of the disclosure, it is judged whether there is a multimedia frame in the buffer queue for which there is a sudden change to the time difference between a time indicated by a presentation time stamp and a time of being received. Only if there is no multimedia frame to be processed in the buffer queue for which there is a sudden change to the time difference, then the multimedia frames to be processed in the current processing cycle are played synchronously, and particularly for the stream in which there is such a multimedia frame with the time difference between a time indicated by a presentation time stamp and a time of being received suddenly becoming larger and then resuming normality, the stream is played synchronously when the stream is stable and played asynchronously when there is a sudden change in the embodiments of the disclosure to thereby alleviate interrupted playing of pictures. If there is a multimedia frame to be processed in the buffer queue for which there is a sudden change to the time difference, then the multimedia frames to be processed in the current processing cycle are played asynchronously, and since they are played asynchronously timely, an instant response can be improved, and synchronous playing of the multimedia frames even after there is a sudden change to the time difference can be alleviated to thereby prevent pictures from being played interruptedly while the multimedia frames being played. Moreover the method according to the embodiments of the disclosure is performed periodically. The playing operations can be performed in each processing cycle in response to a result of the judgment in the current processing cycle to thereby alleviate possible interrupted playing of pictures due to synchronous playing for a long period of time, and alleviate audio and video misalignment due to asynchronous playing from a long period of time.

Furthermore it is judged whether the first difference between each multimedia frame in the buffer queue other than the multimedia frame received at the earliest time and the multimedia frame received at the previous time is above the first threshold, and if there is no first difference above the first threshold, then it is further judged whether the second difference between the time difference of each multimedia frame in the buffer queue and the reference is above the second threshold. This can improve the criterion to determine no sudden change, that is, it will be determined that there is no multimedia frame in the buffer queue with a sudden change to the time difference thereof only if there is neither first difference above the first threshold nor second difference above the second threshold, thus further lowering a risk of interrupted playing of pictures being played.

Furthermore it can be judged whether there is a multimedia frame to be processed with a sudden change to the time difference thereof in such a way that firstly it is judged whether there is a sudden change to the time difference of any of the last M multimedia frames to be processed, sorted in an ascending order of the time of being received, in the buffer queue, and only if there is no sudden change to the time difference of any of the last M multimedia frames to be processed, sorted in an ascending order of the time of being received, in the buffer queue, then the judgment will be further made for the remaining multimedia frames to be processed in the buffer queue; and if there is a sudden change to the time difference of any of the last M multimedia frames to be processed, sorted in an ascending order of the time of being received, in the buffer queue, then the judgment will not be further made for the remaining multimedia frames to be processed in the buffer queue, so that it will not be necessary to make the judgment for all the multimedia frames in the buffer queue, thus improving the processing efficiency.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operations are performed on the computer or the other programmable data processing device to create a computer implemented process so that the instructions executed on the computer or the other programmable device provide operations for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for processing multimedia frames, the method comprising:

judging whether, for each of N multimedia frames to be processed in a buffer queue other than the one of the N multimedia frames received at the earliest time, a first difference between said multimedia frame and the one of the N multimedia frames received at a previous time is above a first threshold, wherein the first difference is a difference between a time difference of said multimedia frame and a time difference of the multimedia frame received at the previous time, wherein each one of the time differences corresponds to a different one of the N multimedia frames and is a difference between a time indicated by a presentation time stamp of the corresponding multimedia frame and a time when the corresponding multimedia frame is received, and the N multimedia frames are sorted in an order of the time of being received in the buffer queue, wherein N is a positive integer and N is greater than or equal to 2;

when there is no first difference above the first threshold, selecting the time difference of one of the N multimedia frames in the buffer queue as a reference, and judging whether a second difference between the time difference of each multimedia frame in the buffer queue and the reference is above a second threshold;

when there is a first difference above the first threshold or there is a second difference above the second threshold, determining that there is the sudden change in time differences of the N multimedia frames in the buffer queue;

when there is neither the first difference above the first threshold nor the second difference above the second threshold, determining that there is no sudden change in time differences of the N multimedia frames in the buffer queue;

playing asynchronously M multimedia frames to be processed in a current processing cycle if there is the sudden change in time differences of the N multimedia frames in the buffer queue, wherein the M multimedia frames to be processed are first M multimedia frames, sorted in an ascending order of the time of being received, in the buffer queue, M is greater than or equal to 1; and playing synchronously the M multimedia frames to be processed in the current processing cycle if there is no sudden change in time differences of the N multimedia frames in the buffer queue and the time differences of the M multimedia frames to be processed are below a preset threshold.

2. The method according to claim 1, wherein judging whether the first difference between each multimedia frame in the buffer queue other than the multimedia frame received at the earliest time and the multimedia frame received at the previous time is above the first threshold comprises:

firstly judging whether the first difference between each of the last M multimedia frames to be processed, sorted in an ascending order of the time of being received, in the buffer queue and the multimedia frame received at the previous time is above the first threshold; and if there is no first difference above the first threshold, then judging whether the first difference between each remaining multimedia frame to be processed in the buffer queue other than the multimedia frame received at the earliest time and the multimedia frame received at the previous time is above the first threshold; and/or judging whether the second difference between the time difference of each multimedia frame in the buffer queue and the reference is above the second threshold comprises: firstly judging whether the second difference between the time difference of each of the last M multimedia frames to be processed, sorted in an ascending order of the time of being received, in the buffer queue and the reference is above the second threshold; and if there is no second difference above the second threshold, then judging whether the second difference between the time difference of each remaining multimedia frame to be processed in the buffer queue and the reference is above the second threshold.

3. A method for processing multimedia frames, the method comprising:

judging whether, for each of N multimedia frames to be processed in a buffer other than the one of the N multimedia frames received at the earliest time, a first difference between said multimedia frame and the one of the N multimedia frames received at a previous time is above a first threshold, wherein the first difference is the difference between the time difference of the multimedia frame and the time difference of the multimedia frame received at the previous time, wherein each one of the time differences corresponds to a different one of the N multimedia frames and is a difference between a time indicated by a presentation time stamp of the corresponding multimedia frame and a time when the corresponding multimedia frame is received, and the N multimedia frames are sorted in an order of the time of being received in the buffer queue, wherein N is a positive integer and N is greater than or equal to 2;

when there is a first difference above the first threshold, determining that there is one of the N multimedia frames in the buffer queue with a sudden change to the time difference thereof;

when there is no first difference above the first threshold in the buffer queue, determining that there is no multimedia frame in the buffer queue with a sudden change to the time difference thereof;

playing asynchronously M multimedia frames to be processed in a current processing cycle when there is the sudden change in time differences of the N multimedia frames in the buffer queue, wherein the M multimedia frames to be processed are first M multimedia frames, sorted in an ascending order of the time of being received, in the buffer queue, M is greater than or equal to 1; and playing synchronously the M multimedia frames to be processed in the current processing cycle when there is no sudden change in time differences of the N multimedia frames in the buffer queue and the time differences of the M multimedia frames to be processed are below a preset threshold.

4. The method according to claim 1, wherein the method further comprises:

judging whether the time differences of the M multimedia frames to be processed in the buffer queue are below a preset threshold; and playing the M multimedia frames to be processed in the current processing cycle if the time differences are not below the preset threshold.

5. A device for processing multimedia frames, the device comprising:

one or more processors; and one or more computer readable memories storing instruction codes, wherein the one or more processors are configured to execute the instruction codes to enable the device to be configured to:

judge whether, for each of N multimedia frames to be processed in a buffer queue other than the one of the N multimedia frames received at the earliest time, a first difference between said multimedia frame and the one of the N multimedia frames received at the previous time is above a first threshold, wherein the first difference is the difference between the time difference of the multimedia frame and the time difference of the multimedia frame received at the previous time, wherein each one of the time differences corresponds to a different one of the N multimedia frames and is a difference between a time indicated by a presentation time stamp of the corresponding multimedia frame and a time when the corresponding multimedia frame is received, and the N multimedia frames are sorted in an order of the time of being received in the buffer queue, wherein N is a positive integer and N is greater than or equal to 2;

when there is no first difference above the first threshold, select the time difference of one of the N multimedia frames in the buffer queue as a reference, and judge whether a second difference between the time difference of each multimedia frame in the buffer queue and the reference is above a second threshold;

when there is a first difference above the first threshold or there is a second difference above the second threshold, determine that there is one of the N multimedia frames in the buffer queue with a sudden change to the time difference thereof;

when there is neither the first difference above the first threshold nor the second difference above the second threshold, determine that there is no multimedia frame in the buffer queue with a sudden change to the time difference thereof;

play asynchronously M multimedia frames to be processed in a current processing cycle if there is the sudden change in time differences of N multimedia frames in the buffer queue, wherein the M multimedia frames to be processed are first M multimedia frames, sorted in an ascending order of the time of being received, in the buffer queue, M is larger than or equal to 1; and play synchronously the M multimedia frames to be processed in the current processing cycle if there is no sudden change in time differences of N multimedia frames in the buffer queue and the time differences of the M multimedia frames to be processed are below a preset threshold.

6. The device according to claim 5, wherein the device configured to judge whether the first difference between each multimedia frame in the buffer queue other than the multimedia frame received at the earliest time and the multimedia frame received at the previous time is above the first threshold is configured to:

firstly judge whether the first difference between each of the last M multimedia frames to be processed, sorted in an ascending order of the time of being received, in the buffer queue and the multimedia frame received at the previous time is above the first threshold; and if there is no first difference above the first threshold, then judge whether the first difference between each remaining multimedia frame to be processed in the buffer queue other than the multimedia frame received at the earliest time and the multimedia frame received at the previous time is above the first threshold; and/or judge whether the second difference between the time difference of each multimedia frame in the buffer queue and the reference is above the second threshold comprises: firstly judging whether the second difference between the time difference of each of the last M multimedia frames to be processed, sorted in an ascending order of the time of being received, in the buffer queue and the reference is above the second threshold; and if there is no second difference above the second threshold, then judge whether the second difference between the time difference of each remaining multimedia frame to be processed in the buffer queue and the reference is above the second threshold.

7. The device according to claim 5, wherein the one or more processors are further configured to execute the instruction codes to enable the device to be further configured to:

judge whether the time differences of the M multimedia frames to be processed in the buffer queue are below the preset threshold; and play the M multimedia frames to be processed in the current processing cycle if the time differences are not below the preset threshold.

8. A non-transitory computer readable storage medium, storing instruction codes, wherein the instruction codes are executed to enable a device for processing multimedia frames to be configured to:

judge whether, for each of N multimedia frames to be processed in a buffer queue other than the one of the N multimedia frames received at the earliest time, a first difference between said multimedia frame and the one of the N multimedia frames received at the previous time is above a first threshold, wherein the first difference is the difference between the time difference of the multimedia frame and the time difference of the multimedia frame received at the previous time, wherein each one of the time differences corresponds to a different one of the N multimedia frames and is a difference between a time indicated by a presentation time stamp of the corresponding multimedia frame and a time when the corresponding multimedia frame is received, and the N multimedia frames are sorted in an order of the time of being received in the buffer queue, wherein N is a positive integer and N is greater than or equal to 2;

when there is a first difference above the first threshold, determine that there is a sudden change in time differences of the N multimedia frames in the buffer queue;

when there is no first difference above the first threshold, determine there is no sudden change in time differences of the N multimedia frames in the buffer queue, or select the time difference of one of the N multimedia frames in the buffer queue as a reference, judge whether a second difference between the time difference of each multimedia frame in the buffer queue and the reference is above a second threshold, when there is a second difference above the second threshold determine that there is a sudden change in time differences of the N multimedia frames in the buffer queue, and when there is neither the first difference above the first threshold nor the second difference above the second threshold determine that there is no sudden change in time differences of the N multimedia frames in the buffer queue;

play asynchronously M multimedia frames to be processed in a current processing cycle if there is the sudden change in time differences of the N multimedia frames in the buffer queue, wherein the M multimedia frames to be processed are first M multimedia frames, sorted in an ascending order of the time of being received, in the buffer queue, M is greater than or equal to 1; and play synchronously the M multimedia frames to be processed in the current processing cycle if there is no sudden change in time differences of the N multimedia frames in the buffer queue and the time differences of the M multimedia frames to be processed are below a preset threshold.

9. The method according to claim 3, wherein judging whether, for each of the N multimedia frames to be processed in a buffer other than the one of the N multimedia frames received at the earliest time, a first difference between said multimedia frame and the one of the multimedia frames received at a previous time is above the first threshold comprises:

first judging whether, for each of the last M multimedia frames to be processed in the buffer queue other than the multimedia frame received at the earliest time in the buffer queue, sorted in an ascending order of the time of being received, a first difference between said multimedia frame and the one of the M multimedia frames received at a previous time is above the first threshold; and when there is no first difference above the first threshold, judging whether, for each remaining multimedia frame to be processed in the buffer queue other than the multimedia frame received at the earliest time, the first difference between said remaining multimedia frame and the one of the remaining multimedia frames received at a previous time is above the first threshold.

10. The method according to claim 3, further comprising:

judging whether the time differences of the M multimedia frames to be processed in the buffer queue are below a preset threshold; and playing the M multimedia frames to be processed in the current processing cycle if the time differences are not below the preset threshold.

11. A device for processing multimedia frames, the device comprising:

one or more processors; and one or more computer readable memories storing instruction codes, wherein the one or more processors are configured to execute the instruction codes to enable the device to be configured to:

judge whether, for each of N multimedia frames to be processed in a buffer queue other than the one of the N multimedia frames received at the earliest time, a first difference between said multimedia frame and the one of the N multimedia frames received at the previous time is above a first threshold, wherein the first difference is the difference between the time difference of the multimedia frame and the time difference of the multimedia frame received at the previous time, wherein each one of the time differences corresponds to a different one of the N multimedia frames and is a difference between a time indicated by a presentation time stamp of the corresponding multimedia frame and a time when the corresponding multimedia frame is received, and the N multimedia frames are sorted in an order of the time of being received in the buffer queue, wherein N is a positive integer and N is greater than or equal to 2;

when there is a first difference above the first threshold, determine that there is one of the N multimedia frames in the buffer queue with a sudden change to the time difference thereof;

when there is no first difference above the first threshold, determine that there is no multimedia frame in the buffer queue with a sudden change to the time difference thereof;

play asynchronously M multimedia frames to be processed in a current processing cycle if there is the sudden change in time differences of N multimedia frames in the buffer queue, wherein the M multimedia frames to be processed are first M multimedia frames, sorted in an ascending order of the time of being received, in the buffer queue, M is larger than or equal to 1; and play synchronously the M multimedia frames to be processed in the current processing cycle if there is no sudden change in time differences of N multimedia frames in the buffer queue and the time differences of the M multimedia frames to be processed are below a preset threshold.

12. The device according to claim 11, wherein the device is configured to judge whether, for each of the N multimedia frames to be processed in a buffer other than the one of the N multimedia frames received at the earliest time, a first difference between said multimedia frame and the one of the multimedia frames received at a previous time is above the first threshold by:

first judging whether, for each of the last M multimedia frames to be processed in the buffer queue other than the multimedia frame received at the earliest time in the buffer queue, sorted in an ascending order of the time of being received, a first difference between said multimedia frame and the one of the M multimedia frames received at a previous time is above the first threshold; and when there is no first difference above the first threshold, judging whether, for each remaining multimedia frame to be processed in the buffer queue other than the multimedia frame received at the earliest time, the first difference between said remaining multimedia frame and the one of the remaining multimedia frames received at a previous time is above the first threshold.

13. The device according to claim 11, wherein the one or more processors are further configured to execute the instruction codes to enable the device to be further configured to:

judge whether the time differences of the M multimedia frames to be processed in the buffer queue are below the preset threshold; and play the M multimedia frames to be processed in the current processing cycle if the time differences are not below the preset threshold.

* * * * *